(12) United States Patent
Handa (10) Patent No.: US 11,043,091 B2
(45) Date of Patent: Jun. 22, 2021

(54) METHOD FOR CONTROLLING AN IMAGE CAPTURING DEVICE THAT CAPTURES AN IMAGE TO BE DISPLAYED OR STORED BY A TERMINAL DEVICE FROM AMONG A PLURALITY OF IMAGE CAPTURING DEVICES

(71) Applicant: CANON KABUSHIKI KAISHA, Tokyo (JP)

(72) Inventor: Masahiro Handa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 291 days.

(21) Appl. No.: 15/413,855

(22) Filed: Jan. 24, 2017

(65) Prior Publication Data
US 2017/0221329 A1 Aug. 3, 2017

(30) Foreign Application Priority Data
Jan. 29, 2016 (JP) .............................. JP2016-016371

(51) Int. Cl.
*H04N 7/18* (2006.01)
*G08B 13/196* (2006.01)

(52) U.S. Cl.
CPC ... *G08B 13/19641* (2013.01); *G08B 13/1966* (2013.01); *G08B 13/19656* (2013.01); *G08B 13/19695* (2013.01); *H04N 7/181* (2013.01); *H04N 7/188* (2013.01)

(58) Field of Classification Search
CPC ........ G08B 13/19695; G08B 13/19656; G08B 13/19641; G08B 13/1966; H04N 7/188; H04N 7/181
See application file for complete search history.

(56) References Cited

U.S. PATENT DOCUMENTS

| 7,956,891 B2 * | 6/2011 | Uchihara | H04N 5/232 348/143 |
| 2006/0268360 A1 * | 11/2006 | Jones | H04N 5/23238 358/448 |
| 2012/0307071 A1 * | 12/2012 | Nishida | H04N 7/188 348/159 |

(Continued)

FOREIGN PATENT DOCUMENTS

| CN | 102404500 A | 4/2012 |
| CN | 104601878 A | 5/2015 |
| JP | 2005065148 A | 3/2005 |

(Continued)

*Primary Examiner* — Leron Beck (74) *Attorney, Agent, or Firm* — Canon U.S.A., Inc. IP Division (57) ABSTRACT

A control apparatus includes an acquisition unit that acquires selection information for selecting, based on a detection result of a sensor, an image capturing device that captures an image to be displayed and/or stored by a terminal device from among a plurality of image capturing devices, and a control unit that performs control in such a manner that a communication amount related to a captured image from an image capturing device that is unlikely to be selected from among the plurality of image capturing devices based on the acquired selection information becomes less than a communication amount related to a captured image from an image capturing device that is likely to be selected based on the acquired selection information.

11 Claims, 8 Drawing Sheets

(56) References Cited

U.S. PATENT DOCUMENTS

2015/0103178 A1* 4/2015 Itoh .................. G08B 13/19641
                                                              348/159
2015/0116501 A1* 4/2015 McCoy .............. H04N 5/23206
                                                              348/169

FOREIGN PATENT DOCUMENTS

| JP | 2011-217055 A | 10/2011 |
| JP | 2015089119 A | 5/2015 |
| WO | 2013179335 A1 | 12/2013 |

* cited by examiner

| CLASSIFICATION | ITEM | DETAILS | EXAMPLE |
|---|---|---|---|
| CONDITION 620-1 | SENSOR CONDITION (THRESHOLD) | WHEN NORMALIZED NUMERICAL VALUE OR THE LIKE IS OBTAINED FROM INFORMATION DETECTED BY SENSOR, RESULT OF COMPARING DETECTED INFORMATION AND PREDETERMINED THRESHOLD IS USED AS CONDITION | DETECTION RESULT OF ILLUMINATION SENSOR IS 10 LUX OR MORE |
| | SENSOR EVENT | WHEN NOTIFICATION INDICATING INFORMATION DETECTED BY SENSOR IS ISSUED AS EVENT, CONTENT OF EVENT IS USED AS CONDITION | DOOR OPEN/CLOSE SENSOR DETECT DOOR OPEN EVENT |
| | TIME | SPECIFIC TIME IS USED AS CONDITION | 8 AM TO 5 PM |
| | CONDITION RELATED TO IMAGE CAPTURING DEVICE | SPECIFIC STATUS OF IMAGE CAPTURING DEVICE IS USED AS CONDITION | TRANSMITTING IMAGE, CAPTURING IMAGE, PTZ VALUE IS WITHIN RANGE OF x TO y |
| BEHAVIOR 630 | IMAGE CAPTURING DEVICE | INFORMATION SPECIFYING IMAGE CAPTURING DEVICE AS CONTROL TARGET | IMAGE CAPTURING DEVICE 300-1, IMAGE CAPTURING DEVICE IN RANGE A |
| | DATA TRANSFER | IDENTIFICATION INFORMATION (SUCH AS IP ADDRESS AND URL) ON TRANSFER DESTINATION AND TYPE OF DATA TO BE TRANSFERRED (MOVIE, SOUND, STILL IMAGE, OR THE LIKE) | TRANSFER IMAGE TO TERMINAL DEVICE 200 |
| | DATA QUALITY | QUALITY OF DATA TO BE TRANSFERRED | RESOLUTION, BITRATE, FRAMERATE |
| | TIMING RELATED TO DATA TO BE TRANSFERRED | TIMING OF GENERATING DATA TO BE TRANSFERRED (START TIME OF MOVIE) | TIMING WHEN CONDITION IS SATISFIED, x SECONDS BEFORE TIMING WHEN CONDITION IS SATISFIED |
| | DATA TRANSFER PERIOD | DURATION OF DATA TRANSFER | x SECONDS AFTER START, TIMING WHEN CONDITION FAILS TO BE SATISFIED |
| | DATA TRANSFER SCHEME | PROTOCOL/FORMAT FOR TRANSFERRING DATA | MOVIE FORMAT (MP4), TRANSFER PROTOCOL (RTP/HLS/MPEG-DASH) |
| | CONTROL | HOW IMAGE CAPTURING DEVICE IS CONTROLLED | PTZ CONTROL FOR IMAGE CAPTURING DEVICE, WARNING SOUND |
| | NOTIFICATION | HOW NOTIFICATION IS ISSUED TO ANOTHER DEVICE, MOBILE TERMINAL OF SECURITY GUARD, AND THE LIKE | NOTIFICATION BY EMAIL, PUSH NOTIFICATION, BROADCASTING |
| PRIORITY 640 | PRIORITY | VALUE USED FOR DETERMINING CONTROL TO BE PRIORITIZED WHEN PLURALITY OF CONTROL TARGETS, BASED ON PLURALITY OF PIECES OF SELECTION INFORMATION, CORRESPOND TO SINGLE IMAGE CAPTURING DEVICE | HIGH/LOW, 0 TO 100 |

METHOD FOR CONTROLLING AN IMAGE CAPTURING DEVICE THAT CAPTURES AN IMAGE TO BE DISPLAYED OR STORED BY A TERMINAL DEVICE FROM AMONG A PLURALITY OF IMAGE CAPTURING DEVICES

BACKGROUND

Field

The present invention relates to a technique for controlling an image capturing device.

Description of the Related Art

Monitoring systems including a plurality of image capturing devices are widely used in a monitoring target facility. In such a system, images captured by the plurality of image capturing devices are collected in a terminal device that displays and records the images. The collected images are analyzed or visually checked by a security guard, whereby abnormalities in the facility can be detected and recorded. Japanese Patent Application Laid-Open No. 2011-217055 discusses the following configuration related to this technique. Specifically, a plurality of sensors is disposed in a monitoring target facility besides the image capturing devices. When the sensors detect an abnormality, an image capturing device most suitable for checking the situation under the abnormality is selected from the image capturing devices. Then, a captured image from the selected image capturing device is stored.

However, the system in which the captured image from the image capturing device selected from the plurality of image capturing devices based on the detection result from the sensors is displayed and/or stored has the following issue. For example, in a case where all the image capturing devices in the system uniformly transmit the captured images to the terminal device that displays and/or stores the images, the transmission of the captured images by the unselected image capturing devices increases load imposed on the image capturing devices, the terminal device, and a network. In a case where all the unselected image capturing devices stop transmitting the captured images, the transmission of the captured image can be delayed. For example, when an image capturing device is newly selected from among the unselected image capturing devices that stop transmitting the captured images, there might be a delay until the selected image capturing device starts transmission and a captured image can be displayed and/or stored.

SUMMARY

A control apparatus includes an acquisition unit configured to acquire selection information for selecting, based on a detection result of a sensor, an image capturing device that captures an image to be displayed and/or stored by a terminal device from among a plurality of image capturing devices, and a control unit configured to perform control in such a manner that a communication amount related to a captured image from an image capturing device that is unlikely to be selected from among the plurality of image capturing devices based on the acquired selection information becomes less than a communication amount related to a captured image from an image capturing device that is likely to be selected based on the acquired selection information.

Further features will become apparent from the following description of exemplary embodiments with reference to the attached drawings.

BRIEF DESCRIPTION OF THE DRAWINGS

FIG. 5 is a table illustrating a content of the selection information.

DESCRIPTION OF THE EMBODIMENTS

Exemplary embodiments are described below with reference to the drawings. It is to be noted that not necessarily all the combinations of the exemplary embodiments described below are required.

[System Configuration]

Figure 1:
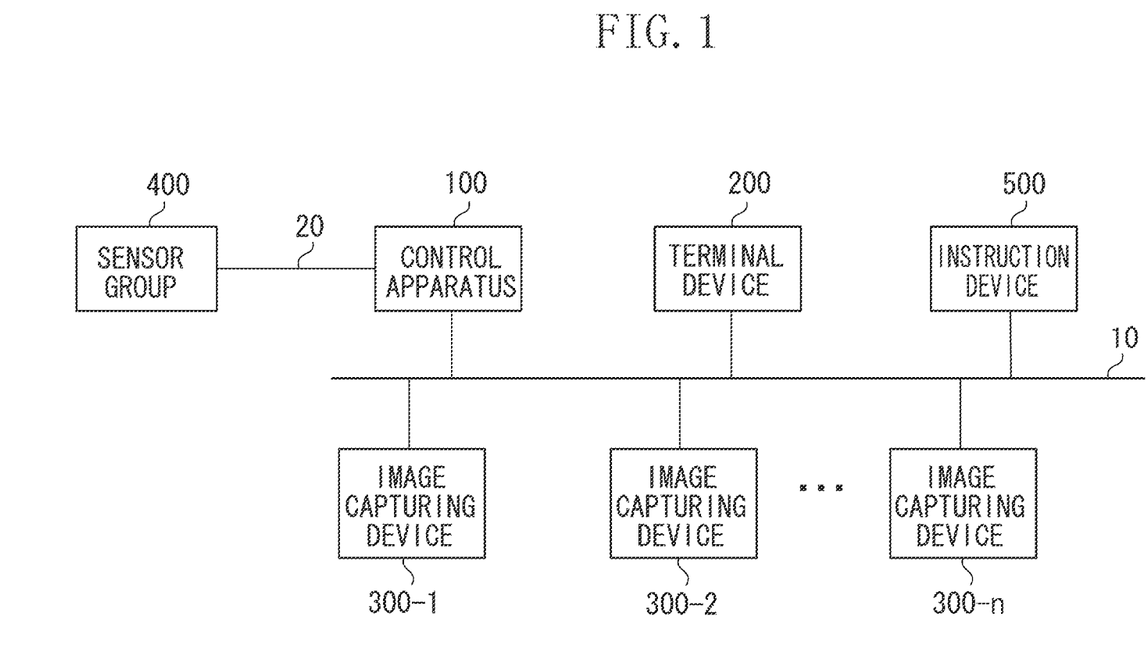
FIG. 1 is a block diagram illustrating a configuration of an image capturing system according to an exemplary embodiment.

FIG. 1 is a block diagram illustrating a configuration of an image capturing system according to the present exemplary embodiment. The image capturing system includes a control apparatus 100, a terminal device 200, an image capturing device 300-1, an image capturing device 300-2, . . . , an image capturing device 300-n, a sensor group 400, and an instruction device 500. In the present exemplary embodiment, n image capturing devices including the image capturing device 300-1 to the image capturing device 300-n are collectively referred to as an image capturing device 300 unless otherwise specified. The control apparatus 100, the terminal device 200, the image capturing device 300, and the instruction device 500 are connected to each other via a network 10. The control apparatus 100 and the sensor group 400 are connected to each other via a network 20.

The connections described above are not seen to be limiting. For example, a network connecting the control apparatus 100, the terminal device 200, and the instruction device 500 to each other can be different from a network connecting the control apparatus 100 and the image capturing device 300 to each other. Alternatively, for example, the network 10 and the network 20 can be connected to each other to establish a single network. The control apparatus 100 and the terminal device 200 can be integrally formed. The terminal device 200 and the instruction device 500 can be integrally formed.

The network 10 and the network 20 can each be the Internet, a wired local area network (LAN), a wireless LAN, a wide area network (WAN), etc. The communication protocol, the size, and the configuration of the network 10 and the network 20 are not limited. For example, the network 10 and the network 20 can each be an adhoc network, an ultra-wide band (UWB), etc. For example, the network 10 and the network 20 can employ Ethernet®, Bluetooth®, Zigbee®, or the like as the communication protocol. The network 10 and the network 20 can be different from each other in the communication protocol, the configuration, etc.

The control apparatus 100 according to the present exemplary embodiment is connected to each of the terminal device 200, the image capturing device 300, the sensor group 400, and the instruction device 500 via the network 10 or the network 20. The control apparatus 100 receives captured images transmitted from the plurality of image capturing devices 300. The control apparatus 100 acquires selection information 600 based on an instruction from the instruction device 500. Then, based on the selection information 600 and the detection result received from the sensor group 400, the control apparatus 100 selects a specific image capturing device 300 from the plurality of image capturing devices 300.

Figure 4:
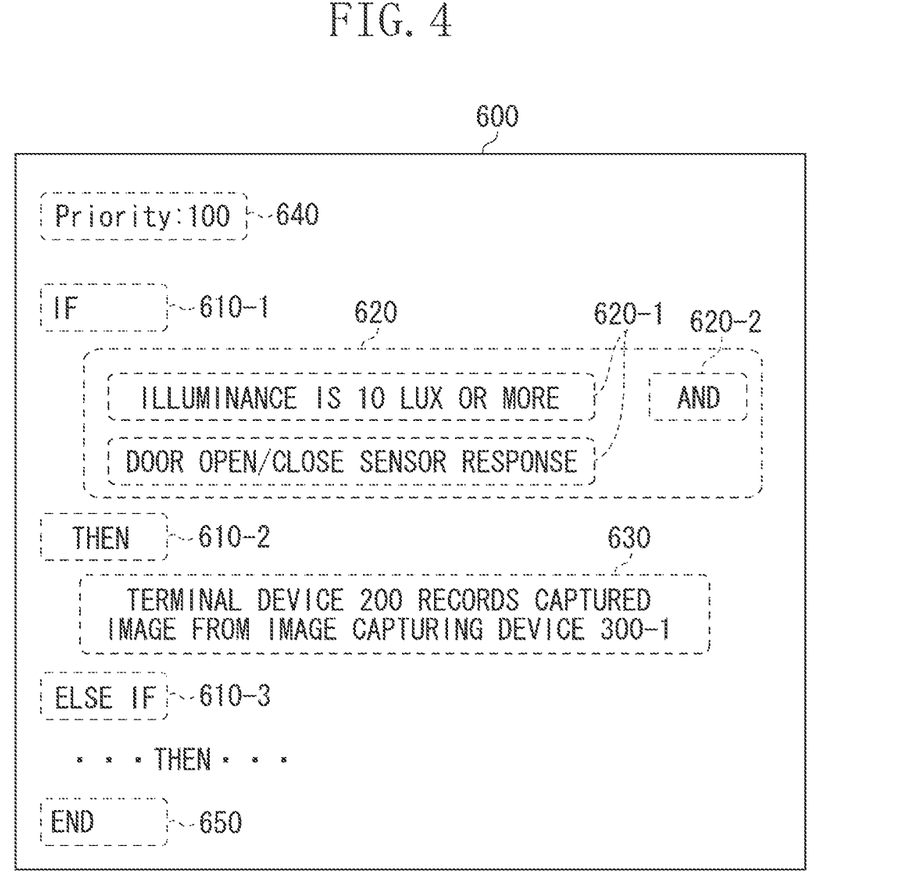
FIG. 4 is a diagram illustrating an example of selection information according to the exemplary embodiment.

As exemplarily illustrated in FIG. 4, the selection information 600 includes information (conditional expression 610-1, conditional expression 610-2, and conditional expression 610-3) associating the detection result (condition 620-1) received from the sensor group 400 with information (behavior 630) for identifying the image capturing device 300. The selection information 600 is described in detail below. The control apparatus 100 transfers to the terminal device 200 a captured image in the received captured images, which has been transmitted from the selected image capturing device 300. Thus, the control apparatus 100 can transmit the captured image from the image capturing device 300, which is most suitable according to the detection result from the sensors, to the terminal device 200. The control apparatus 100 can execute image processing on the image to be transferred to the terminal device 200.

In a case where the control apparatus 100 uniformly receives the captured images from all the image capturing devices 300 in the system and then selects the captured image to be transferred to the terminal device 200, load on the image capturing device 300, the control apparatus 100, and the network 10 can increase. In a case where the control apparatus 100 only receives the captured image to be transferred to the terminal device 200, when the image capturing device 300 capturing the captured image to be transferred changes, the control apparatus 100 needs to control start/stop of the transmission of the captured image from the image capturing device 300. Such control can lead to a delay before the captured image from the newly selected image capturing device 300 is transferred to the terminal device 200, and thus the usability of the system is compromised. In view of the above, the control apparatus 100 according to the present exemplary embodiment performs control in such a manner that the captured image is received from the image capturing device 300 the captured image from which is likely to be transferred to the terminal device 200. Thus, the amount of data of the captured images transmitted from the other image capturing devices 300 can be reduced.

Specific examples of the control apparatus 100 include a personal computer (PC), a micro server, a home gateway, a relay device such as a router, a server device including video management software (VMS), and a mobile terminal such as a smartphone or a tablet. The control apparatus 100 is not limited to these specific examples, and can be other devices.

The terminal device 200 is connected to the control apparatus 100 and the image capturing device 300 via the network 10. The terminal device 200 receives the captured image captured by the image capturing device 300 and transferred from the control apparatus 100, and displays and records the received image. The terminal device 200 can directly receive the captured image transmitted from the image capturing device 300 selected by the control apparatus 100 without using the control apparatus 100. Specific examples of the terminal device 200 include a display and a recording server.

The image capturing device 300 is connected to the control apparatus 100 and the terminal device 200 via the network 10. The image capturing device 300 conforms to a standard such as an Open Network Video Interface Forum (ONVIF), Universal Plug and Play (UPnP), or Digital Living Network Alliance (DLNA). The image capturing device 300 is not limited conforming to these standards, and can conform to other standards or employ other systems. The image capturing device 300 captures an image and transmits the captured image to the control apparatus 100. In an exemplary configuration of the present exemplary embodiment, the captured image transmitted by the image capturing device 300 is a moving image. However, the captured image is not limited to a moving image and can be a still image as well. The captured image can include sounds. The image capturing device 300 can transmit the captured image to the terminal device 200.

The image capturing device 300 is controlled by the control apparatus 100. Examples of the control performed by the control apparatus 100 on the image capturing device 300 include data control, image capturing control, and status control. The data control is related to a transmission function of the image capturing device 300. Examples of the target of the data control include start/stop of the transmission as well as a frame rate, resolution, and bit rate of the captured image to be transmitted. The image capturing control is related to an image capturing function of the image capturing device 300. Examples of the target of the image capturing control include start/stop of the image capturing, the frame rate of the image capturing, and a resolution and bit rate of the image to be captured. The status control is related to the status of the image capturing device 300. Examples of the status control include start/stop of the image capturing device, and pan/tilt/zoom (PTZ) of the image capturing device. The content of the control performed by the control apparatus 100 on the image capturing device 300 is not limited to the examples described above, and other types of control can be performed.

The sensor group 400 includes a plurality of sensors, and is connected to the control apparatus 100 via the network 20. The sensor group 400 includes a function of transmitting a detection result from each sensor to the control apparatus 100. For example, the detection result received by the control apparatus 100 from the sensor group 400 is related to at least one of temperature, luminance, vibration, infrared light, time, time period, and whether a door is open/closed. However, what the sensor group 400 can detect is not limited to the above-described items, and the sensor group 400 can include sensors that detect other types of information. The plurality of sensors in the sensor group 400 can detect respectively different contents, and can detect the same content at different positions.

The instruction device 500 is connected to the control apparatus 100 via the network 10, and transmits an instruction for causing the control apparatus 100 to acquire the selection information 600. Examples of the instruction device 500 include a PC, a micro server, a server device including VMS, and a mobile terminal such as a smartphone or a tablet. The instruction device 500 is not limited to these devices, and can be any other device type.

[Functional Configuration of Control Apparatus 100]

Figure 2:
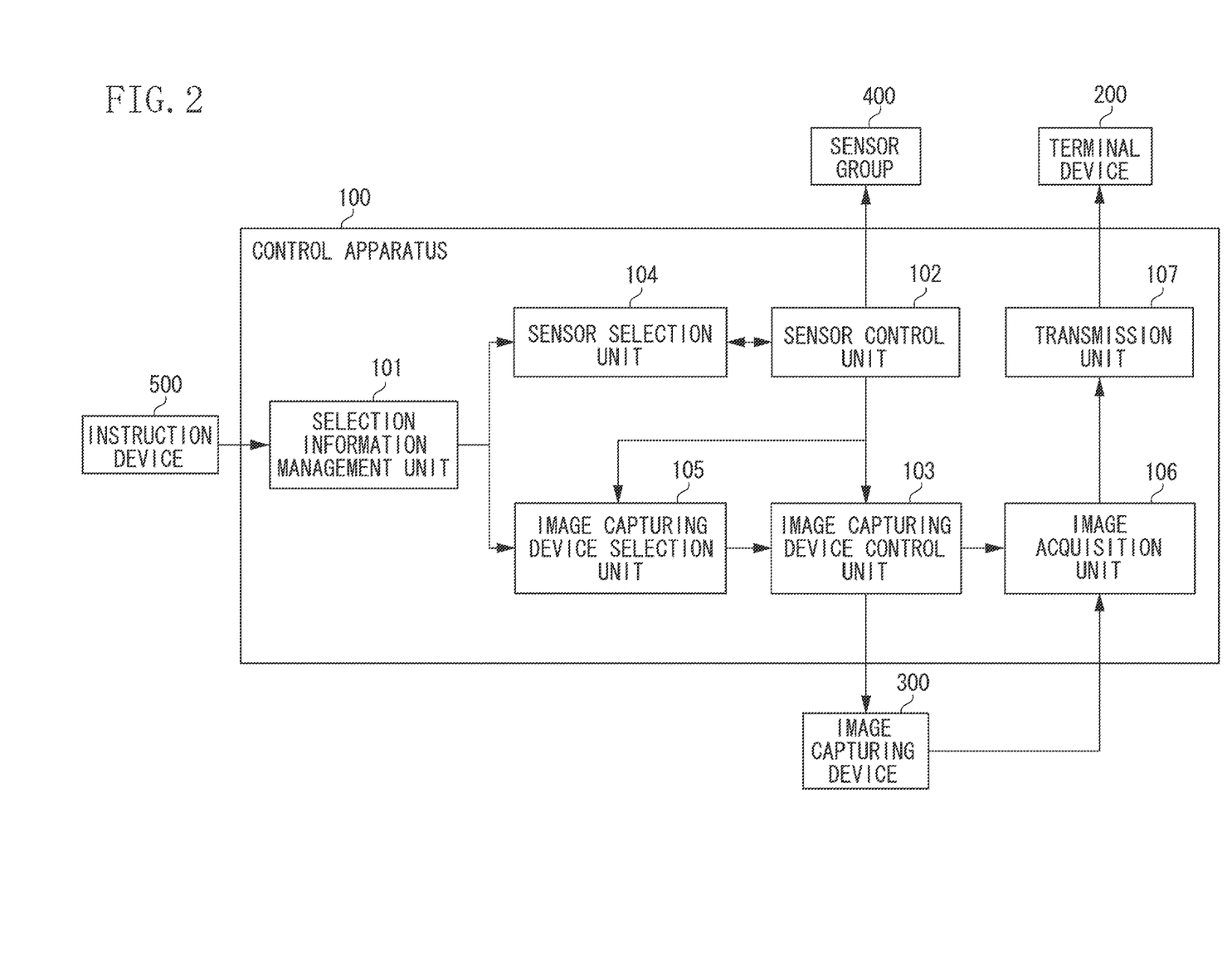
FIG. 2 is a block diagram illustrating a functional configuration of a control apparatus according to the exemplary embodiment.

A functional configuration of the control apparatus 100 will now be described with reference to FIG. 2. The control apparatus 100 includes a selection information management unit 101 (hereinafter, referred to as a management unit 101), a sensor control unit 102, an image capturing device control unit 103 (hereinafter, referred to as an image capturing control unit 103), a sensor selection unit 104, an image capturing device selection unit 105 (hereinafter, referred to as an image capturing selection unit 105), an image acquisition unit 106, and a transmission unit 107.

The management unit 101 acquires and manages the selection information 600 based on an instruction received from the instruction device 500. The selection information 600 according to the present exemplary embodiment is used by the control apparatus 100 for selecting the image capturing device 300 that transmits the captured image to be displayed and/or stored by the terminal device 200 from among the plurality of image capturing devices 300, based on the detection results from the sensors. The specific details of the selection information 600 is described below.

The sensor control unit 102 includes a function of performing sensor search, advertise message monitoring, and operation check for the sensor for recognizing the sensor group 400 that operates while being connected to the network 20. The sensor control unit 102 manages the recognized sensors and receives the detection results from the sensors. The sensor control unit 102 can receive the detection result by subscribing the detection event from the sensors (in other words, the sensor control unit 102 can order the sensors to transmit, according to occurrence of the detection event, the detection result) or can periodically request the sensors to transmit the detection result. The sensor control unit 102 controls the sensors based on a specifying result from the sensor selection unit 104 described below. Specifically, for example, the sensor control unit 102 controls the start/stop of the detection by the sensor, a sampling rate of the measurement, and start/stop of the transmission of the detection result. The sensor control unit 102 is not limited to just the above-described control.

The image capturing control unit 103 includes functions of searching for the image capturing device 300, monitoring advertise messages, performing operation check for the image capturing device 300, or the like to recognize the image capturing device 300 that operates while being connected to the network 10. The mage capturing control unit 103 controls the recognized image capturing device 300 based on the specifying result obtained by the image capturing selection unit 105 described below. The image capturing control unit 103 further controls reception/transmission of an image by the image acquisition unit 106.

The sensor selection unit 104 includes a function of specifying, based on the selection information 600 acquired by the management unit 101, the sensor for which a processing amount related to detection processing is to be reduced in the sensor group 400. The image capturing selection unit 105 selects, based on the detection result received by the sensor control unit 102 and the selection information 600 acquired by the management unit 101, the image capturing device 300 that captures an image to be displayed and/or stored by the terminal device 200. The image capturing selection unit 105 also executes processing different from the selection described above. Specifically, the image capturing selection unit 105 specifies, based on the selection result acquired by the management unit 101, the image capturing device 300 for which a data amount of the transmitted captured image is to be reduced in the plurality of image capturing devices 300.

The image acquisition unit 106 receives, based on the control performed by the image capturing control unit 103, the captured images transmitted from the image capturing devices 300. Then, the image acquisition unit 106 transmits, from among the received captured images, the captured image captured by the specified image capturing device 300, to the transmission unit 107. The transmission unit 107 transfers the image received from the image acquisition unit 106 to the terminal device 200. The image acquisition unit 106 can execute image processing on the image received from the image capturing device 300, and then transmit the resultant image to the transmission unit 107.

[Hardware Configuration of Control Apparatus 100]

Figure 3:
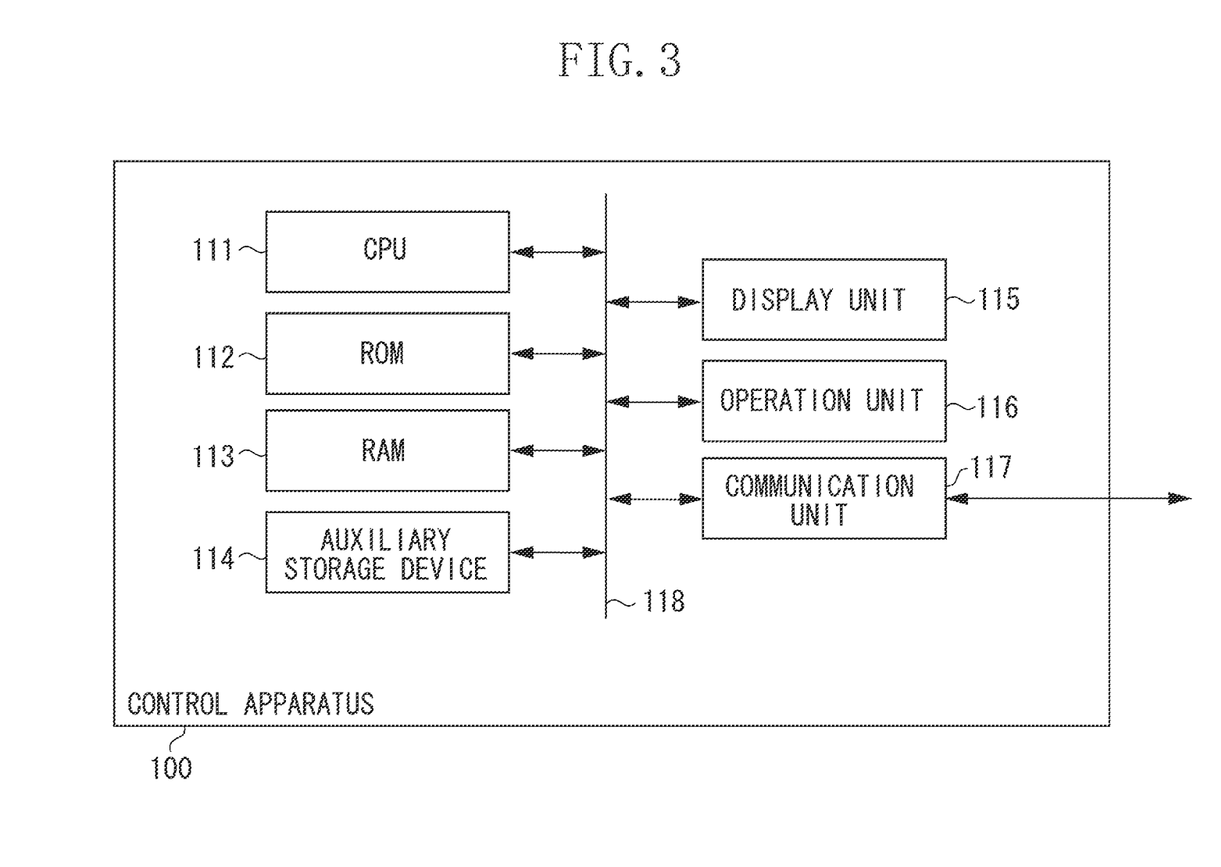
FIG. 3 is a block diagram illustrating a hardware configuration of the control apparatus.

FIG. 3 is a block diagram illustrating a hardware configuration of the control apparatus 100. The control apparatus 100 includes a central processing unit (CPU) 111, a read only memory (ROM) 112, a random access memory (RAM) 113, an auxiliary storage device 114, a display unit 115, an operation unit 116, a communication unit 117, and a bus 118.

The CPU 111 controls the control apparatus 100 as using a computer program and data stored in the ROM 112 and the RAM 113. The CPU 111 implements functions of the components of the control apparatus 100 illustrated in FIG. 2. The ROM 112 stores therein a program and a parameter that do not need to change. The RAM 113 temporarily stores a program and data supplied from the auxiliary storage device 114, data acquired from external to the control apparatus 100 via the communication unit 117, etc. The auxiliary storage device 114, for example, can include a hard disk drive device, and store the captured image and data such as the detection result from the sensors.

The display unit 115 includes, for example, a liquid crystal display (LCD), and displays a graphical user interface (GUI) enabling a user to operate the control apparatus 100, etc. The operation unit 116 includes, for example, a keyboard and a mouse, and provides various instructions to the CPU 111 based on a user operation. The communication unit 117 communicates with external devices, such as the terminal device 200, the image capturing device 300, the sensor group 400, the instruction device 500, and a relay device (not illustrated). The communication unit 117 includes an antenna to enable the control apparatus 100 to wirelessly connect with the external devices. To establish a wired connection between the control apparatus 100 and the external devices, a LAN cable, for example, is attached to the communication unit 117. The bus 118 connects the components of the control apparatus 100 so that information is transmitted therebetween.

The display unit 115 and/or the operation unit 116, which are provided in the control apparatus 100 in the present exemplary embodiment, can be a separate device external to the control apparatus 100. In such a case, the CPU 111 operates as a display control unit that controls the display unit 115 and/or as an operation control unit that controls the operation unit 116.

[Content of Selection Information]

The content of the selection information 600 managed by the management unit 101 will now be described. The management unit 101 can acquire the selection information 600 from the instruction device 500, or can generate the selection information 600 in response to an instruction from the instruction device 500.

FIG. 4 is a diagram illustrating an example of the selection information 600. The conditional expression 610-1, the conditional expression 610-2, and the conditional expression 610-3 are written in the selection information 600. In the description below, the conditional expressions 610-1, 610-2, and 610-3 are collectively referred to as a conditional expression 610 unless otherwise specified. A conditional statement 620, a behavior 630, an indicator 650, and a priority 640 are also written in the selection information 600. The conditional statement 620 includes a condition 620-1 and an operator 620-2. FIG. 5 illustrates a specific example of the condition 620-1, the behavior 630, and the priority 640 written in the selection information 600. The selection information 600 is not limited to the contents in the example illustrated in FIG. 5, and can include other items and contents written therein.

In FIG. 4, the conditional statement 620 follows the conditional expression 610-1 indicating a branch, in the selection information 600. The behavior 630 indicating processing executed in a case where the conditional statement 620 holds true follows the conditional expression 610-2. The indicator 650 indicating the end of the selection information 600 follows the behavior 630. The priority 640 can be written in the selection information 600. A plurality of pieces of the selection information 600 acquired by the control apparatus 100 can include a plurality of descriptions indicating associations between the detection result from the sensor and the information for identifying the image capturing device. In such a case, the priority 640 indicates the priority of each association. Thus, the control apparatus 100 executes processing based on the selection information 600 with a larger value of the priority 640 amongst the plurality of pieces of selection information 600 thus acquired.

In the selection information 600, a plurality of the conditional expressions 610 can be written. In the conditional statement 620, a plurality of the conditions 620-1 and a plurality of the operators 620-2 can be written. The management unit 101 can collectively acquire/manage a plurality of pieces of selection information 600 as a single piece of content. Specific examples of the operator 620-2 include AND, OR, NOT, NAND, NOR, and EXOR. The conditional expression 610 is not limited to a single branch, and can be multiple branches, a case structure (SWITCH statement), etc. In the behavior 630, a plurality of types of processing can be written. The selection information 600 is not limited to the format and the order illustrated in FIG. 4, and can be written in other formats, such as a structured language including Extensible Markup Language (XML), a script language including Python, and a program language.

[Processing Flow of System]

Figure 6:
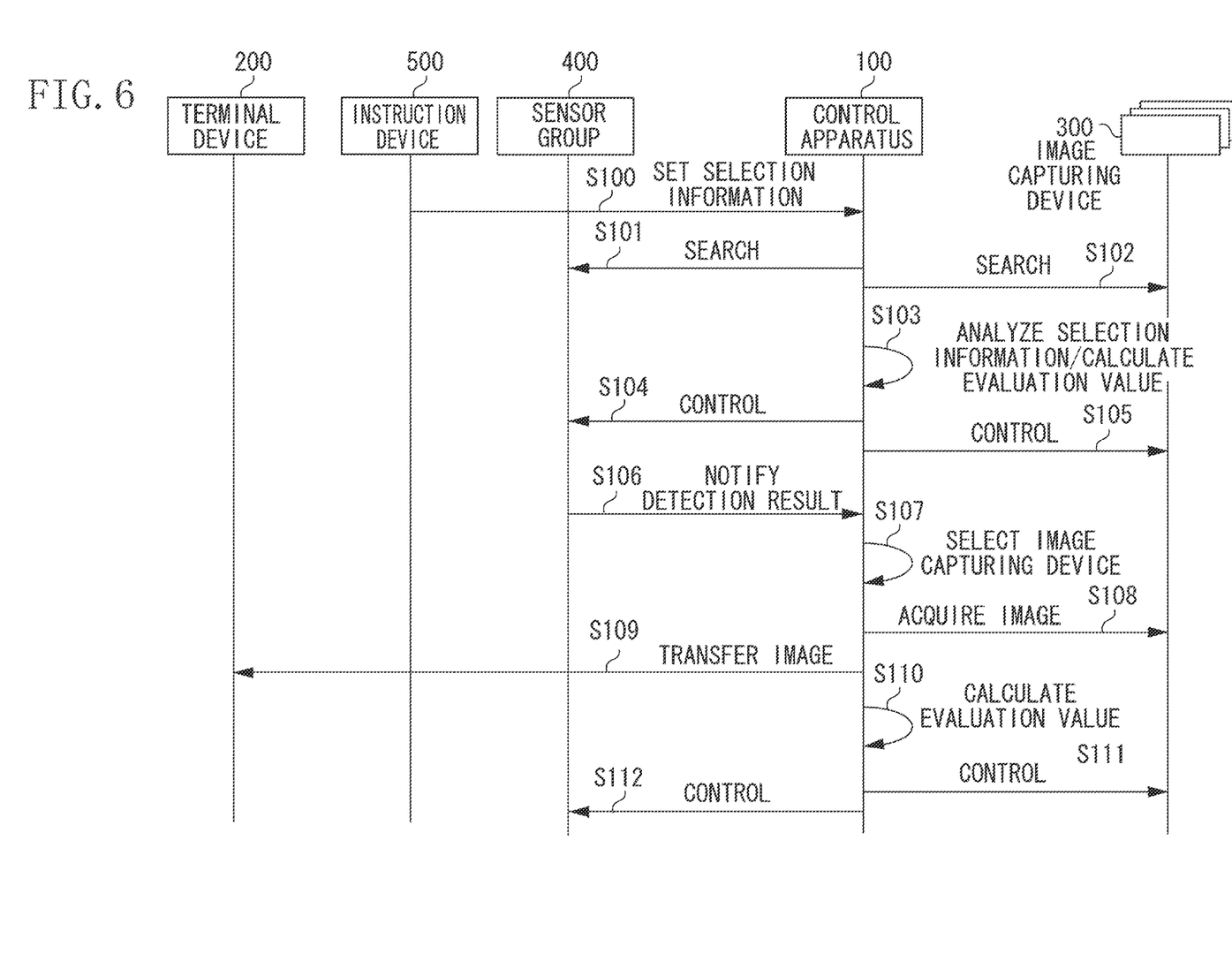
FIG. 6 is a sequence diagram illustrating processing executed in the image capturing system.
Figure 7:
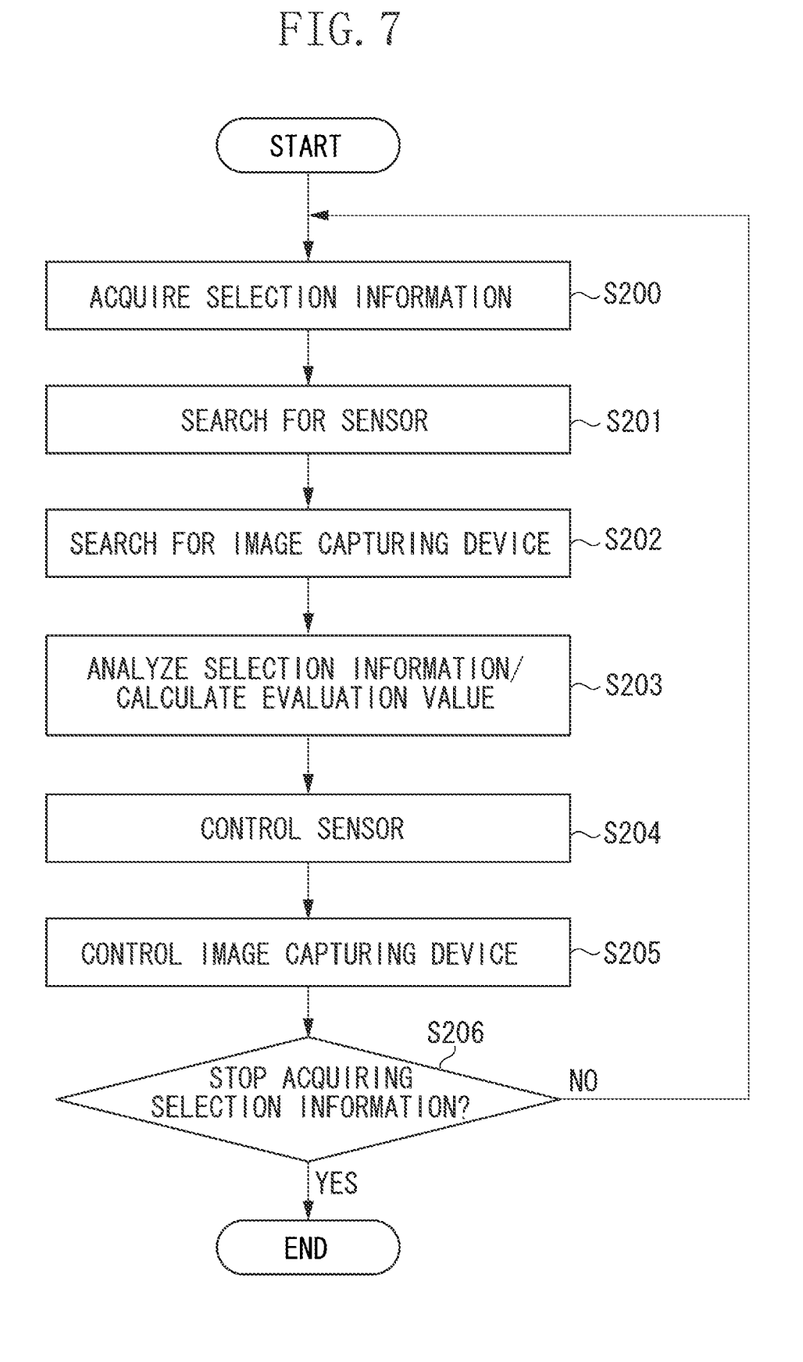
FIG. 7 is a flowchart illustrating processing related to acquisition of the selection information by the control apparatus.
Figure 8:
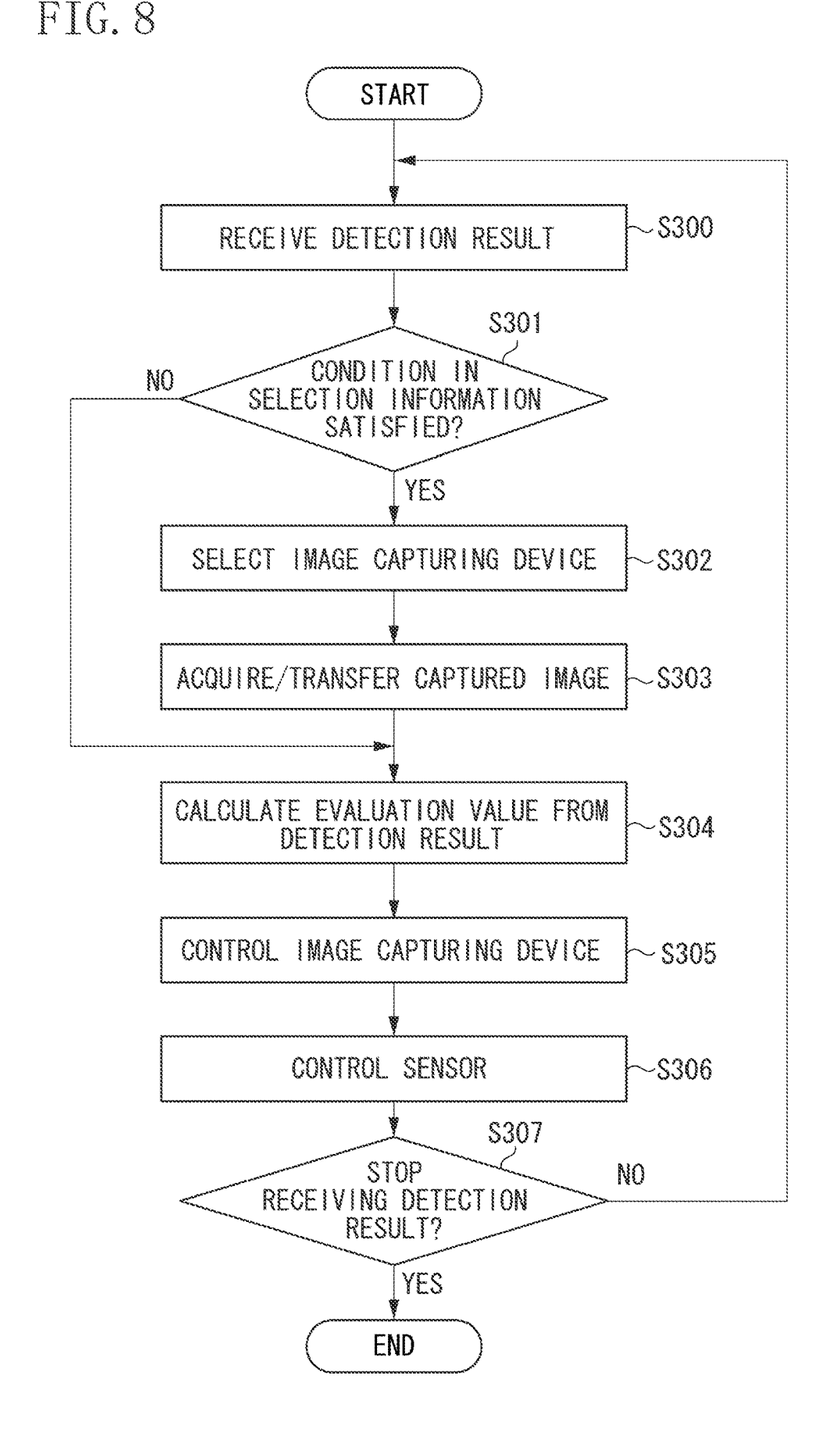
FIG. 8 is a flowchart illustrating processing related to reception of a detection result by the control apparatus.

Next, a processing flow of the image capturing system is described with reference to FIGS. 6 to 8. FIG. 6 is a sequence diagram illustrating processing executed in the image capturing system. FIGS. 7 and 8 are each a flowchart illustrating processing executed by the control apparatus 100. The processing illustrated in FIG. 7 starts at a timing when connection for communications is established between the control apparatus 100 and the instruction device 500. The processing illustrated in FIG. 8 starts at a timing when connection for communications is established between the control apparatus 100 and the sensor group 400. The timings when the processing illustrated in FIG. 7 and FIG. 8 starts are not limited to those described above. The processing illustrated in FIG. 7 and FIG. 8 is implemented when the CPU 111 loads a program stored in the ROM 112 onto the RAM 113 and executes the program. FIG. 6 and FIGS. 7 and 8 are concurrently described below.

In step S100 (S200), the management unit 101 receives an instruction from the instruction device 500, and acquires the selection information 600 based on the instruction. The selection information 600 according to the present exemplary embodiment is used by the control apparatus 100 for selecting, based on the detection result from the sensor group 400, the image capturing device 300 that transmits the captured image to be displayed and/or stored by the terminal device 200 from the plurality of image capturing devices 300. When the selection information 600 that has previously been acquired is currently being managed, the management unit 101 performs management based on determination of whether to delete the previously acquired selection information 600 or to hold both the previously acquired selection information 600 and the selection information 600 that is newly acquired. The management unit 101 can acquire the selection information 600 from the instruction device 500, or can generate the selection information 600 in response to the instruction from the instruction device 500.

In step S101 (S201), the sensor control unit 102 searches for the sensor connected to the network 20. When the sensor connected to the network 20 has already been searched for by the sensor control unit 102, the processing in this step can be skipped. In step S102 (S202), the image capturing control unit 103 searches for the image capturing device 300 connected to the network 10. When the image capturing device 300 connected to the network 10 has already been searched for by the image capturing control unit 103, the processing in this step can be skipped. The processing in step S101 (S201) and the processing in step S102 (S202) can be executed in reverse order or concurrently executed.

In step S103 (S203), the image capturing selection unit 105 analyzes the selection information 600 acquired by the management unit 101 in step S200, and sets an evaluation value to each of the plurality of image capturing devices 300. The evaluation value is set based on the selection information 600 acquired by the management unit 101. The evaluation value corresponds to a likelihood of each of the image capturing devices 300 to be selected as the image capturing device 300 that transmits the captured image to be displayed and/or stored by the terminal device 200. For example, a low evaluation value is set to the image capturing device 300 that is not written as the control target in the selection information 600 acquired by the management unit 101, and from which the captured image is not transferred to the terminal device 200 regardless of the value of the detection result from the sensor. For example, the evaluation value can be set based on a history indicating the situation where each of the image capturing devices 300 has been selected, or the number of times the image capturing device 300 has been selected.

The image capturing selection unit 105 specifies, based on the selection information 600 that has been acquired by the management unit 101, the image capturing device 300 for which the data amount of the captured image to be transmitted is reduced in the plurality of image capturing devices 300. For example, the image capturing device 300 with an evaluation value lower than a predetermined threshold is specified. In this specifying method, the image capturing device 300 that is not to be selected based on the selection information 600 acquired by the management unit 101 is specified as the image capturing device for which the data amount is reduced. The captured images are not transferred from the specified image capturing devices 300 regardless of the detection result from the sensor, unless the management unit 101 newly acquires the selection information 600. Thus, reduction of the data amount of such a captured image does not significantly compromise the usability of the system. The method for specifying the image capturing device 300 for which the data amount of the captured image is to be reduced is not limited to the example described above, and other methods for specifying the image capturing device 300 based on other references can be employed. The system can include the image capturing device 300 for which the transmission data amount is not to be reduced regardless of the content of the selection information 600.

The sensor selection unit 104 specifies the sensor for which the processing amount related to detection processing is to be reduced, from the plurality of sensors in the sensor group 400 based on the selection information 600 acquired by the management unit 101. For example, the sensor not written in the condition 620 in the selection information 600 acquired by the management unit 101, i.e., the sensor of which the detection result is not involved in the above-described specification by the image capturing selection unit 105 based on the selection information 600 acquired by the management unit 101. The detection results obtained by such sensors are not to be used unless the management unit 101 newly acquires the selection information 600. Thus, the reduction in the processing amount for the detection processing for obtaining such a detection result would not significantly compromise the usability of the system. The method for selecting the sensor by the sensor selection unit 104 is not limited to this. For example, the sensor selection unit 104 can set an evaluation value to each sensor as in the case where the image capturing device 300 is specified by the image capturing selection unit 105. Thus, the sensor for which the processing amount related to the detection processing is to be reduced can be specified based on the evaluation value. The system can include the sensor for which the processing amount is not to be reduced regardless of the content of the selection information 600.

In step S104 (S204), the sensor control unit 102 controls the sensor based on the result of the specifying performed by the sensor selection unit 104 in step S103 (S203). More specifically, the sensor control unit 102 controls the sensor specified by the sensor selection unit 104 so that the sensor is turned OFF, stops the detection, performs measurement at lower sampling rate, or is operated in the other like manner. Thus, the processing amount related to the detection processing executed by the sensor thus controlled is reduced, whereby lower power consumption is achieved. The sensor control unit 102 can control the sensor that is not specified by the sensor selection unit 104 so that the sensor is turned ON, starts the detection, performs measurement at a higher sampling rate, or is operated in the other like manner. The control performed by the sensor control unit 102 is not limited to the above described example, and can be other types of control.

In step S105 (S205), the image capturing control unit 103 controls the image capturing device 300 based on the result of the specification performed by the image capturing selection unit 105 in step S103 (S203). More specifically, the image capturing control unit 103 controls the image capturing device 300 specified by the image capturing selection unit 105 so that the image capturing device 300 is turned OFF, stops capturing an image, or stops transmitting the captured image. The control performed by the image capturing control unit 103 is not limited to these. For example, control can be performed so that resolution of the captured image to be transmitted is reduced, resolution of an image to be captured is reduced, the frame rate of the captured image to be transmitted is reduced, or the image is captured at a lower frame rate. Thus, the data amount of the captured image transmitted from the image capturing device 300 thus controlled is reduced, so that load on the network 10 and the power consumption of the image capturing device 300 are reduced. The image capturing control unit 103 can control the image capturing device 300 that is not specified by the image capturing selection unit 105 so that the image capturing device 300 is turned ON, starts transmitting the captured image, or captures images with higher frame rate/resolution. The processing in step S104 (S204) and the processing in step S105 (S205) can be executed in reverse order or concurrently executed.

In step S206, the management unit 101 determines whether to stop the acquisition of the selection information 600. If the management unit 101 determines to stop the acquisition of the selection information 600 (YES in step S206), the processing in FIG. 7 is terminated. If the management unit 101 determines not to stop the acquisition of the selection information 600 (NO in step S206), the management unit 101 waits for a new instruction from the instruction device 500.

In step S106 (S300), the sensor control unit 102 receives the detection result from the sensor group 400. To receive the detection result, the sensor control unit 102 can perform polling on each sensor or subscribing a detection event for each sensor.

In step S301, the image capturing selection unit 105 checks the detection result against the selection information 600 to check whether the conditional statement 620 in the selection information 600 holds true. When the conditional statement 620 holds true (YES in step S301), the processing proceeds to step S302. When no conditional statement 620 holds true (NO in step S301), the processing proceeds to step S304. In a case where the conditional statement 620 that has been previously determined to be true exists, the image capturing selection unit 105 checks whether the condition still holds true.

In step S107 (S302), the image capturing selection unit 105 selects, based on the detection result received by the sensor control unit 102 and the selection information 600 acquired by the management unit 101, the image capturing device 300 that transmits the captured image to be displayed and/or stored by the terminal device 200. More specifically, the image capturing selection unit 105 selects the image capturing device 300 written in the behavior 630 corresponding to the conditional expression 620 that holds true in the selection information 600.

In step S303, the control apparatus executes processing written in the behavior 630 corresponding to the conditional statement 620 that holds true. In the sequence described in FIG. 6 as an example, in step S108, the image acquisition unit 106 receives the captured images transmitted from the plurality of image capturing devices 300. Then, in step S109, the transmission unit 107 transfers to the terminal device 200, the captured image transmitted by the image capturing device 300 selected by the image capturing selection unit 105, in the captured images received by the image acquisition unit 106 in step S108. In a case where a plurality of the behaviors 630, respectively corresponding to a plurality of condition expressions 620 that holds true, cannot be concurrently executed, the control apparatus 100 determines the behavior 630 to be prioritized in accordance with the timing at which the selection information 600 is set, the priority 640, and the like, and executes the processing. In a case where the conditional statement 620 corresponding to the behavior 630 in which the ongoing processing is written no longer holds true, the control apparatus 100 terminates the ongoing processing.

In step S110 (S304), the image capturing selection unit 105 recalculates, based on the detection result received in step S300, the evaluation value that has been set in step S103 (S203). Examples of how the evaluation value is calculated are described below. The description is provided based on an exemplary case where the conditional statement 620, describing a condition where the image capturing device 300 as the target is selected, includes 10 conditions 620-1 that are connected to each other with AND as the operators 620-2. The image capturing selection unit 105 sets 10 as the evaluation value of the target image capturing device 300 when one of the 10 conditions 620-1 is true and the other conditions 620-1 are false. The evaluation value is increased by 10 each time the condition 620-1 that holds true increases by one. Alternatively, the evaluation value can be calculated based on a physical quantity indicated by the detection result. In other words, the evaluation value of the image capturing device 300 that is selected when the temperature exceeds 100° C. can be set based on the temperature indicated by the detection result. The evaluation value, for example, can be set to be 40 when the temperature is 40° C., and to be 60 when the temperature is 60° C. With the evaluation value thus calculated, the control can be performed, by the control apparatus 100 while distinguishing the image capturing device 300 that is likely to be selected from those that are less likely to be selected, in the image capturing devices 300 that can be selected based on the selection information 600.

The sensor selection unit 104 calculates the evaluation value for each sensor, similarly to the image capturing selection unit 105 calculating the evaluation value for the image capturing device 300. For example, the evaluation value for the sensor that detects whether a certain door in a building is open/closed can be set based on the detection result from an adjacent sensor for detecting whether a door is open/closed.

In step S111 (S305), the image capturing control unit 103 controls the image capturing device 300 based on the evaluation value calculated by the image capturing selection unit 105. For example, the image capturing control unit 103 controls the image capturing device 300 with an evaluation value lower than the predetermined threshold, so that the data amount of the captured image transmitted from the image capturing device 300 is reduced, as in the processing in step S105 (S205) described above. In step S112 (S306), the sensor control unit 102 controls the sensor group 400 in accordance with the evaluation values calculated by the sensor selection unit 104. For example, the sensor control unit 102 controls the sensor with the evaluation value lower than the predetermined threshold so that the processing amount related to the detection processing executed by such a sensor is reduced, as in the processing in step S104 (S204) described above. With these types of control, the power consumption of the image capturing device 300 and the sensor group 400, and the load on the network 10, can be reduced. The processing in step S111 (S305) and the processing in step S112 (S306) can be executed in reverse order or concurrently executed.

The image capturing control unit 103 can control the image capturing devices 300 with the evaluation values lower than the predetermined threshold uniformly, or differently in accordance with the difference in the evaluation values. For example, the image capturing control unit 103 can perform control in such a manner that the image capturing device 300 that stops transmitting the captured image is distinguished from the image capturing device 300 that captures images at a lower frame rate. The same applies to the control performed by the sensor control unit 102 on the sensors.

In a case where the image capturing device 300 serving as the control target is in a sleep mode, the image capturing control unit 103 can wait until the image capturing device 300 recovers from the sleep mode to issue a notification for control to the image capturing device 300. Alternatively, the image capturing control unit 103 can issue a notification to initiate the recovery of the image capturing device 300 from the sleep mode at an appropriate timing. The image capturing control unit 103 can determine, based on the evaluation value set for the image capturing device 300, whether to wait for the timing when the image capturing device 300 recovers from the sleep mode. For example, the image capturing control unit 103 can wait for the recovery timing to issue the notification to the image capturing device 300 with a low evaluation value, and can issue the notification to the image capturing device 300 with a high evaluation value without waiting for the recovery timing. The same applies to the control performed by the sensor control unit 102 on the sensor. The sensor control unit 102 can change an interval of polling performed on the sensor in accordance with the evaluation value. For example, the sensor control unit 102 can set a short polling interval for a sensor with a high evaluation value, and can set a long polling interval for a sensor with a low evaluation value.

In step S307, the sensor control unit 102 determines whether to stop the reception of the detection results from the sensor group 400. When the sensor control unit 102 determines to stop the reception (YES in step S307), the processing in FIG. 8 is terminated. When the sensor control unit 102 determines not to stop the reception (NO in step S307), the sensor control unit 102 waits until the detection result is newly received from the sensor group 400.

As described above, the control apparatus 100 according to the present exemplary embodiment receives the detection result from the sensor group 400. The control apparatus 100 then acquires the selection information 600 for selecting, based on the detection result, the image capturing device 300 that captures the captured image to be displayed and/or stored by the terminal device 200 from the plurality of image capturing devices 300. The control apparatus 100 specifies, based on the selection information 600 thus acquired, the image capturing device 300 for which the data amount of the captured image to be transmitted is to be reduced in the plurality of image capturing devices 300. Then, the control apparatus 100 controls the image capturing device 300 based on the specifying result. Thus, in the image capturing system in which the captured image from the image capturing device 300 selected from the plurality of image capturing devices 300 based on the detection results from the sensor group 400 is displayed and/or stored, the following effects can be obtained. Specifically, a lower load on the system can be achieved compared with the case where all the image capturing devices 300 uniformly transmit the captured images. A delay in the transmission of the captured image can be reduced compared with a case where all the unselected image capturing devices 300 stop transmitting the captured images.

In the configuration described in the present exemplary embodiment, the control apparatus 100 sets the evaluation value to each of the image capturing devices 300 and the sensors. Thus, the image capturing device 300 for which the data amount of the captured image to be transmitted is to be reduced and a sensor for which the processing amount related to the detection processing is to be reduced are specified. The control apparatus 100 specifies the image capturing device 300 and the sensor based on the selection information 600, and does not necessarily set the evaluation value. The control apparatus 100 can perform control in such a manner that the amount of data transmitted from the image capturing device 300 is reduced without performing the control to reduce the processing amount of the sensor. Also in this configuration, the effect of achieving a lower load on the system without compromising the usability of the system can be achieved.

In the present exemplary embodiment, the configuration is described where the image capturing device 300 that transmits the captured image with a reduced data amount is specified and controlled. However, the configuration is not limited thereto, and the image capturing device 300 that transmits the captured image with an increased data amount can be specified and controlled. For example, the control apparatus 100 can perform control in such a manner that a communication amount related to the captured image of the image capturing device unlikely to be selected based on the selection information 600 acquired becomes less than the communication amount related to the captured image of the image capturing device likely to be selected based on the selection information 600 acquired. For example, the control apparatus 100 can perform control in such a manner that the communication amount related to the captured image of the image capturing device with an evaluation value, set based on the likelihood to be selected, lower than a threshold becomes less than the communication amount related to the captured image of the image capturing device with an evaluation value higher than the threshold.

In the configuration described in the present exemplary embodiment, the control apparatus 100 controls the communication amount related to the transmission of the captured image by the image capturing device 300. However, the configuration is not limited thereto, and the control apparatus 100 can control the communication amount related to the transfer of the captured image to the terminal device 200. For example, the plurality of image capturing devices 300 transmits a plurality of captured images to the control apparatus 100. Then, the control apparatus 100 transfers, to the terminal device 200, the captured image that is likely to be selected based on the selection information 600 from the plurality of captured images, with a high image quality. The control apparatus 100 can perform control in such a manner that the captured image that is unlikely to be selected from the plurality of captured image thus received based on the selection information 600 is transferred to the terminal device 200 with a low image quality or is not transferred to the terminal device 200.

According to the exemplary embodiment described above, in a system in which a captured image of an image capturing device selected from a plurality of image capturing devices is used, load imposed on the system can be reduced without compromising the usability of the system.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-016371, filed Jan. 29, 2016, which is hereby incorporated by reference herein in its entirety.

What is claimed is:

1. A control apparatus comprising:
one or more processors; and
one or more memories including instructions that, when executed by the processor(s), cause the control apparatus to:
acquire selection information that specifies one or more image capturing devices to be selected from a plurality of image capturing devices based on a detection result of a sensor, wherein the selection information includes information of a sensor of which the detection result is involved in specifying the one or more capturing devices;
control for reducing a communication data amount related to a captured image from image capturing devices not included as the one or more image capturing devices to be selected based on the acquired selection information before the detection result is acquired;
transmit a captured image from image capturing devices included as the one or more image capturing devices to be selected based on the selection information, among the plurality of image capturing devices; and
be capable of communicating with a plurality of sensors, wherein, the communication data amount from image capturing devices not included as the one or more image capturing devices to be selected is reduced to be smaller than the communication data amount from image capturing devices included as the one or more image capturing devices to be selected, and wherein a processing amount related to detection processing by a sensor of which the detection result is not involved in specifying the one or more capturing devices is controlled to be smaller than a processing amount related to detection processing by a sensor of which the detection result is involved in specifying the one or more capturing devices.

2. The control apparatus according to claim 1, wherein:
the control apparatus receives the detection result from the sensor;

the control apparatus selects the image capturing device based on the acquired selection information and the received detection result;

the control apparatus receives a captured image transmitted from at least one of the plurality of image capturing devices; and the control apparatus transfers, to a terminal device, the captured image received from the selected image capturing device.

3. The control apparatus according to claim 1, wherein the communication data amount of the transmitted captured image is an amount related to transmission of the captured image by the image capturing device.

4. The control apparatus according to claim 3, wherein the control performed by the control apparatus on the communication data amount of the transmitted captured image includes at least one of processing for stopping the transmission of the captured image from the image capturing device, processing for reducing a resolution of the captured image transmitted from the image capturing device, or processing for reducing a frame rate of the captured image transmitted from the image capturing device.

5. The control apparatus according to claim 3, wherein the control performed by the control apparatus on the communication data amount of the transmitted captured image includes at least one of processing for stopping image capturing by the image capturing device, processing for reducing a resolution of an image captured by the image capturing device, or processing for reducing a frame rate of image capturing performed by the image capturing device.

6. The control apparatus according to claim 1, wherein the control performed by the control apparatus includes at least one of processing for stopping the detection by the sensor, processing for reducing a sampling rate of measurement performed by the sensor, or processing for stopping transmission of the detection result from the sensor.

7. The control apparatus according to claim 1, wherein the acquired selection information includes information indicating association between the detection result and information for identifying an image capturing device.

8. The control apparatus according to claim 7, wherein the acquired selection information includes information specifying a priority of each association between the detection result and the information for identifying the image capturing device.

9. The control apparatus according to claim 1, wherein the detection result relates to a result of detection of at least one of temperature, luminance, vibration, infrared ray, time, time period, or open/closed status of a door.

10. A control method for a control apparatus, the control method comprising:

acquiring selection information that specifies one or more image capturing devices based on a detection result of a sensor, wherein the selection information includes information of a sensor of which the detection result is involved in specifying the one or more capturing devices;

control for reducing a communication data amount related to a captured image from image capturing devices not included as the one or more image capturing devices to be selected based on the acquired selection information before the detection result is acquired; and be capable of communicating with a plurality of sensors, wherein, the communication data amount from image capturing devices not included as the one or more image capturing devices to be selected is reduced to be smaller than the communication data amount from image capturing devices included as the one or more image capturing devices to be selected, and wherein a processing amount related to detection processing by a sensor of which the detection result is not involved in specifying the one or more capturing devices is controlled to be smaller than a processing amount related to detection processing by a sensor of which the detection result is involved in specifying the one or more capturing devices.

11. A non-transitory computer-readable storage medium storing computer executable instructions for causing a control apparatus to execute a control method, the control method comprising:

acquiring selection information that specifies one or more image capturing devices based on a detection result of a sensor, wherein the selection information includes information of a sensor of which the detection result is involved in specifying the one or more capturing devices;

control for reducing a communication data amount related to a captured image from image capturing devices not included as the one or more image capturing devices to be selected based on the acquired selected information before the detection result is acquired;

transmit a captured image from image capturing devices included as the one or more image capturing devices to be selected based on the selection information, among the plurality of image capturing devices; and be capable of communicating with a plurality of sensors, wherein, the communication data amount from image capturing devices not included as the one or more image capturing devices to be selected is reduced to be smaller than the communication data amount from image capturing devices included as the one or more image capturing devices to be selected, and wherein a processing amount related to detection processing by a sensor of which the detection result is not involved in specifying the one or more capturing devices is controlled to be smaller than a processing amount related to detection processing by a sensor of which the detection result is involved in specifying the one or more capturing devices.

* * * * *